United States Patent

Kanazawa

(10) Patent No.: US 11,878,428 B2
(45) Date of Patent: Jan. 23, 2024

(54) CONTROL APPARATUS AND CONTROL METHOD FOR ROBOT

(71) Applicant: SEIKO EPSON CORPORATION, Tokyo (JP)

(72) Inventor: Kana Kanazawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 238 days.

(21) Appl. No.: 16/879,162

(22) Filed: May 20, 2020

(65) Prior Publication Data

US 2020/0368907 A1 Nov. 26, 2020

(30) Foreign Application Priority Data

May 22, 2019 (JP) ................................. 2019-095790

(51) Int. Cl.
 *B25J 9/16* (2006.01)
 *G05B 19/4063* (2006.01)
 *B25J 9/00* (2006.01)

(52) U.S. Cl.
 CPC .......... *B25J 9/1674* (2013.01); *B25J 9/0084* (2013.01); *G05B 19/4063* (2013.01); *G05B 2219/32234* (2013.01); *G05B 2219/32371* (2013.01)

(58) Field of Classification Search
 CPC ... B25J 9/1674; B25J 9/0084; G05B 19/4063; G05B 19/4184; G05B 2219/32234; G05B 2219/32371; Y02P 90/80; Y02P 90/02
 See application file for complete search history.

(56) References Cited

U.S. PATENT DOCUMENTS

| | | | | |
|---|---|---|---|---|
| 6,694,285 B1 * | 2/2004 | Choe | ...................... | G01H 1/003 702/56 |
| 7,024,335 B1 * | 4/2006 | Parlos | ................ | G05B 23/0283 702/182 |
| 8,170,893 B1 * | 5/2012 | Rossi | ................... | G06Q 10/063 705/7.11 |
| 2015/0149392 A1 * | 5/2015 | Bolich | ..................... | G06N 5/02 706/11 |
| 2015/0328774 A1 * | 11/2015 | Yajima | ................... | B25J 9/1676 702/183 |
| 2016/0149996 A1 * | 5/2016 | Eckert | ..................... | H04L 43/06 709/217 |
| 2017/0153625 A1 * | 6/2017 | Yamamoto | ......... | G05B 19/4184 |

FOREIGN PATENT DOCUMENTS

| | | |
|---|---|---|
| JP | 2016-100026 | 5/2016 |
| JP | 2017-102554 | 6/2017 |

* cited by examiner

*Primary Examiner* — Stephen Holwerda
(74) *Attorney, Agent, or Firm* — WORKMAN NYDEGGER

(57) ABSTRACT

A control apparatus that controls a plurality of robots, includes a failure prediction part that predicts a time of failure with respect to each component of the robots, a maintenance time adjustment part that adjusts maintenance times of the plurality of robots based on the components for which the times of failure are predicted, and a load adjustment part that adjust workloads of the robots according to the predicted times of failure for activation until the maintenance times.

8 Claims, 7 Drawing Sheets

FIG. 6

| | OPERATOR REQUIRED | OPERATOR NOT REQUIRED |
|---|---|---|
| REPLACEMENT TIME:SHORT<br>START-UP TIME:SHORT | BEFORE START OF OPERATION<br>AFTER END OF OPERATION<br>(A)<br>SHORT-RANGE MAINTENANCE<br>LONG-RANGE MAINTENANCE | BEFORE START OF OPERATION<br>AFTER END OF OPERATION<br>(B)<br>SHORT-RANGE MAINTENANCE<br>LONG-RANGE MAINTENANCE |
| REPLACEMENT TIME:SHORT<br>START-UP TIME:LONG | (C)<br>SHORT-RANGE MAINTENANCE<br>LONG-RANGE MAINTENANCE | AFTER END OF OPERATION<br>(D)<br>SHORT-RANGE MAINTENANCE<br>LONG-RANGE MAINTENANCE |
| REPLACEMENT TIME:LONG<br>START-UP TIME:SHORT | (E)<br>SHORT-RANGE MAINTENANCE<br>LONG-RANGE MAINTENANCE | (F)<br>SHORT-RANGE MAINTENANCE<br>LONG-RANGE MAINTENANCE |
| REPLACEMENT TIME:LONG<br>START-UP TIME:LONG | (G)<br>LONG-RANGE MAINTENANCE | (H)<br>LONG-RANGE MAINTENANCE |

FIG. 7

| FREQUENCY | MAINTENANCE TIME |
|---|---|
| HIGH | BEFORE START OF OPERATION,<br>AFTER END OF OPERATION<br><br>SHORT-RANGE MAINTENANCE |
| LOW | LONG-RANGE MAINTENANCE |

CONTROL APPARATUS AND CONTROL METHOD FOR ROBOT

The present application is based on, and claims priority from JP Application Serial Number 2019-095790, filed May 22, 2019, the disclosure of which is hereby incorporated by reference herein in its entirety.

BACKGROUND

1. Technical Field

The present disclosure relates to a control apparatus and control method for robot.

2. Related Art

Regarding a control apparatus that controls a robot, JP-A-2017-102554 discloses a technique of estimating times of failure of components forming the robot from the activation status of the robot. In JP-A-2017-102554, to prevent the estimated time of failure from preceding a predetermined time to replace the component, the time of failure of the robot is delayed by cease of part of work by the robot or reduction of the action speed.

However, in JP-A-2017-102554, times to replace the components when failures are estimated with respect to a plurality of robots are not sufficiently considered. Accordingly, when failures are estimated with respect to a plurality of robots, maintenance times at which component replacement etc. are performed may vary from robot to robot and productivity may be lower.

SUMMARY

A first aspect is directed to a control apparatus that controls a plurality of robots, and includes a failure prediction part that predicts a time of failure with respect to each component of the robots, a maintenance time adjustment part that adjusts maintenance times of the plurality of robots based on the components for which the times of failure are predicted, and a load adjustment part that adjusts workloads of the robots according to the predicted times of failure for activation until the maintenance times.

A second aspect is directed to the first aspect, in which the maintenance time adjustment part may adjust the maintenance times based on necessity of an operator in maintenances on the components for which the times of failure are predicted.

A third aspect is directed to the first or second aspect, in which the maintenance time adjustment part may adjust the maintenance times based on times necessary for maintenances on the components for which the times of failure are predicted.

A fourth aspect is directed to any one of the first to third aspect, in which the maintenance time adjustment part may adjust the maintenance times based on times necessary from ends of maintenances on the components for which the times of failure are predicted to activation of the robots.

A fifth aspect is directed to any one of the first to fourth aspects, in which the maintenance time adjustment part may adjust the maintenance times when the predicted respective times of failure fall within a predetermined period and may not adjust the maintenance times when the predicted respective times of failure do not fall within the period.

A sixth aspect is directed to any one of the first to fifth aspects, in which the load adjustment part may decrease the workloads when the predicted times of failure are earlier than the maintenance times and increase the workloads when the predicted times of failure are later than the maintenance times.

A seventh aspect is directed to any one of the first to sixth aspects, in which the failure prediction part may predict the respective times of failure with respect to the plurality of components, and determine the times of failure of the component having the earliest predicted time of failure of the plurality of components as the time of failure of the robot.

An eighth aspect is directed to a control method for a plurality of of robots executed by a control apparatus, including predicting a time of failure with respect to each component of the robots, adjusting maintenance times of the plurality of robots based on the components for which the times of failure are predicted, and adjusting workloads of the robots according to the predicted times of failure for activation until the maintenance times.

BRIEF DESCRIPTION OF THE DRAWINGS

FIG. 6 is a diagram for explanation of a method of adjusting maintenance times of a robot alone.

FIG. 7 is a diagram for explanation of frequencies of maintenance times.

DESCRIPTION OF EXEMPLARY EMBODIMENTS

Figure 1:
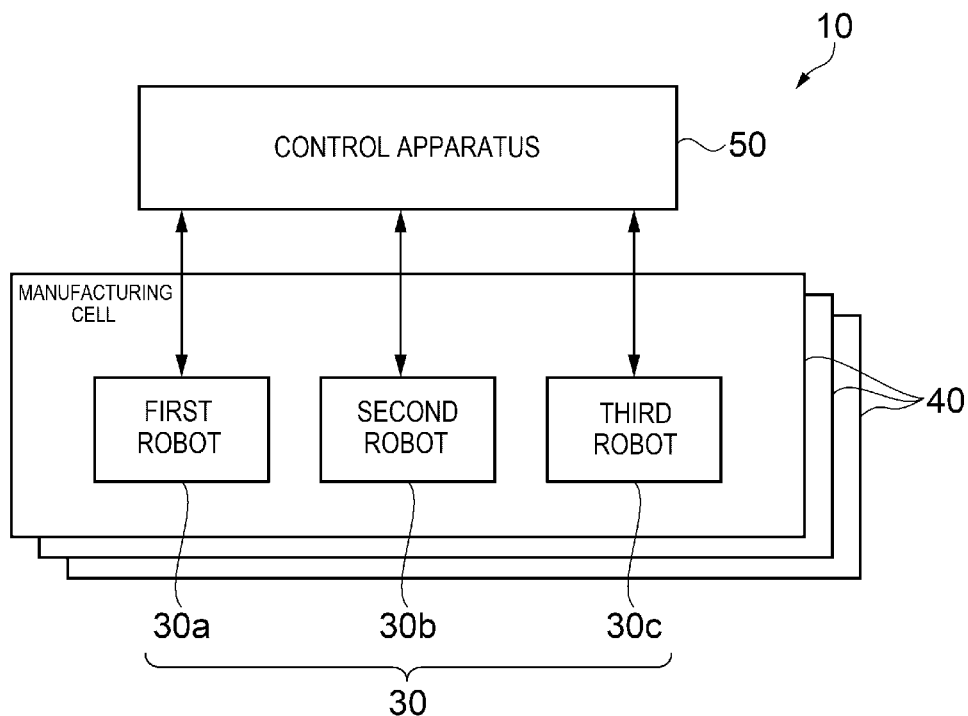
FIG. 1 is a diagram for explanation of a schematic configuration of a robot system.

FIG. 1 shows an example of a schematic configuration of a robot system 10 in the embodiment. The robot system 10 includes a plurality of manufacturing cells 40 and a control apparatus 50. Each manufacturing cell 40 is a set of manufacturing facilities including a plurality of robots 30. The respective manufacturing cells 40 are placed in positions apart from one another within a factory. In the embodiment, each manufacturing cell 40 includes a first robot 30a, a second robot 30b, and a third robot 30c. Hereinafter, these robots are referred to as "robots 30" when explained without distinction. In the embodiment, the respective robots 30 within the manufacturing cell 40 individually perform production and machining of objects. Any number of robots 30 may be provided in each manufacturing cell 40. The control apparatus 50 controls the plurality of robots 30. The control apparatus 50 may be placed within the factory in which the manufacturing cells 40 are placed or placed in a location apart from the factory. The control apparatus 50 and the respective robots 30 communicate with each other via a network such as e.g. an intranet or the internet.

Figure 2:
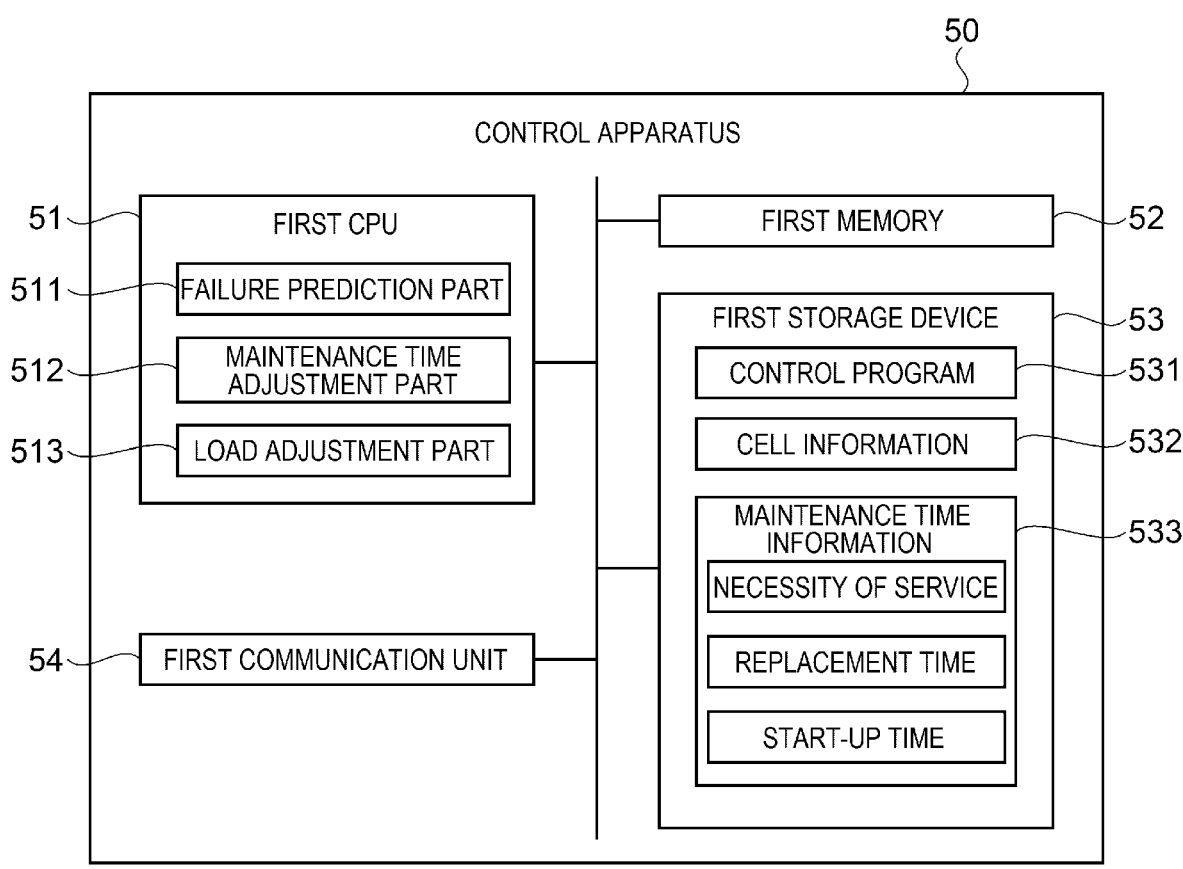
FIG. 2 is a block diagram for explanation of a schematic configuration of a control apparatus.

FIG. 2 is a block diagram showing an example of the schematic configuration of the control apparatus 50. The control apparatus 50 is configured as a computer including a first CPU 51 and a first memory 52. The control apparatus 50 further includes a first storage device 53 and a first communication unit 54 for communication with the respective robots 30. The first storage device 53 stores a control program 531, cell information 532, and maintenance time information 533. The first storage device 53 is a computer-readable storage medium. The maintenance time information 533 has a plurality of maintenance times and related information used for selection of a specific maintenance time from the plurality of maintenance times. The maintenance time information 533 has information on e.g. necessity of service, replacement time, start-up time, etc. The first communication unit 54 is a communication interface for communication with the respective robots 30 via a network according to the control by the first CPU 51.

The first CPU 51 is a processing circuit that operates as a failure prediction part 511, a maintenance time adjustment part 512, and a load adjustment part 513 by loading and executing the control program 531 in the first memory 52. The first CPU 51 may be replaced by another processing circuit or replaced by a processing block including a plurality of pieces of hardware.

The failure prediction part 511 acquires activation information from the respective robots 30 via the first communication unit 54, and predicts a time of failure with respect to each component of the robots 30 based on the acquired activation information. The activation information contains command values for driving the respective components of the robots 30 and histories of output values of sensors provided in the respective components. In the embodiment, the failure prediction part 511 respectively predicts the times of failure with respect to the plurality of components forming the respective robots 30. The failure prediction part 511 may determine the time of failure of the component at the earliest predicted time of failure as the time of failure of the robot 30.

The times of failure of the respective components can be predicted by known various methods. For example, the failure prediction part 511 may predict a time of failure of a servo motor based on a temporal change of a difference between a speed command value to the servo motor provided in an arm or end effector of the robot 30 and a real speed value calculated based on an output value from an encoder. When the above described difference does not exceed a predetermined threshold value, the failure prediction part 511 determines that no failure will occur in the servo motor and, when the difference exceeds the threshold value, determines that a failure will occur in the servo motor. When determining that a failure will occur in the servo motor, the failure prediction part 511 may predict the time of failure by calculating a time until the difference increases to a predetermined reference value based on the previous time rate of change of the difference. Further, the failure prediction part 511 may detect amplitude of vibration generated in the servo motor based on the output value from the encoder or an output value of a vibration sensor and predict the time of failure of the servo motor based on the temporal change of the amplitude. When the above described amplitude does not exceed a predetermined threshold value, the failure prediction part 511 determines that no failure will occur in the servo motor and, when the amplitude exceeds the threshold value, determines that a failure will occur in the servo motor. When determining that a failure will occur in the servo motor, the failure prediction part 511 may predict the time of failure by calculating a time until the amplitude increases to a predetermined reference value based on the previous time rate of change of the amplitude. The failure prediction part 511 may predict the time of failure based on a change of a current value supplied to each component or a change of a response time of an output signal relative to an input signal, not according to those methods.

The maintenance time adjustment part 512 adjusts maintenance times of the plurality of robots 30 based on the component for which the time of failure is predicted by the failure prediction part 511. The maintenance time adjustment part 512 adjusts the maintenance times based on at least one type of information of e.g. necessity of service, component replacement time, and start-up time on the component for which the time of failure is predicted. Further, for adjustment of the maintenance times, a lead time from an order of the component to an actually replaceable status may be added as a condition. Note that, in the embodiment, "maintenance" refers to replacement, repair, adjustment, inspection, servicing, etc.

The load adjustment part 513 performs adjustment of workloads of the respective robots 30 according to the predicted times of failure of the respective robots 30 so that the respective robots 30 may be activated until the maintenance times adjusted by the maintenance time adjustment part 512. In other words, the load adjustment part 513 performs adjustment of workloads of the respective robots 30 according to the predicted times of failure of the respective robots 30 so that the times of failure may come at the maintenance times adjusted by the maintenance time adjustment part 512. The processing executed by the load adjustment part 513 will be explained later in detail.

In the cell information 532, correspondence relationships between the manufacturing cells 40 and the robots 30 contained in the manufacturing cells 40 are recorded. The first storage device 53 may identify the manufacturing cell 40 to which the robot 30 belongs with respect to each robot 30 with reference to the cell information 532.

Of the maintenance time information 533, information on the necessity of service is information representing the necessity of an outside operator in the maintenance with respect to each component of the robot 30. For example, when it is necessary to call an outside operator of another company than the company handling the manufacturing cells 40 such as a manufacturer for replacement of the component of the robot 30, compared to the case where the component of the robot 30 can be replaced only by an inside operator, the number of restrictions including security protection is larger when component replacement work is planned. The information on the replacement time is information representing the time necessary for the maintenance including replacement with respect each component of the robot 30. The information on the start-up time is information representing the time necessary from the end of the maintenance with respect each component of the robot 30 to the activation of the robot 30. In other words, the start-up time is e.g. a time taken from power-on of the robot 30 to normal activation including production and machining of objects. For example, in a robot for welding, it is necessary to heat a component to a designated temperature and, in a robot for environmental testing, a standby time is necessary for stabilization of the environment.

Figure 3:
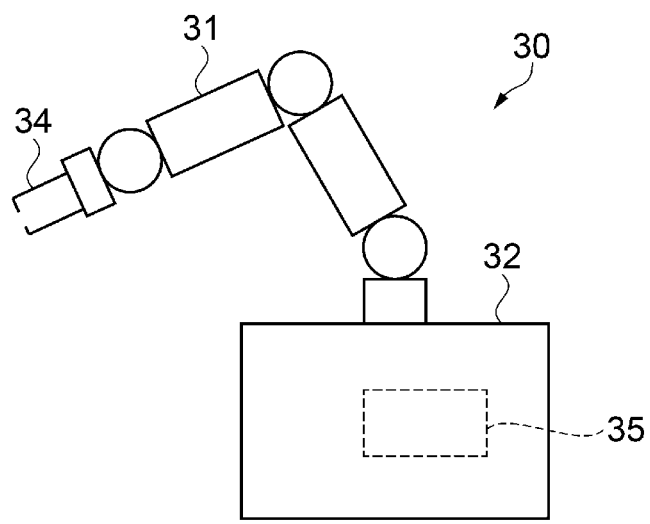
FIG. 3 is a diagram for explanation of a schematic configuration of a robot.

FIG. 3 shows an example of the schematic configuration of the robot 30. Each robot 30 includes an arm 31 and a base 32. The proximal end of the arm 31 is fixed to the base 32. An end effector 34 is attached to the distal end of the arm 31. As the end effector 34, any type of end effector including a welding gun, screw fastener, hole puncher, and cutter can be attached to the arm 31. The arm 31 includes a plurality of joints. In each joint, a servo motor and an encoder that detects the rotation position of the servo motor are provided. In the base 32, a robot control unit 35 for controlling the action of the robot 30 is provided. Note that the robot control unit 35 may be formed separately from the robot 30.

Figure 4:
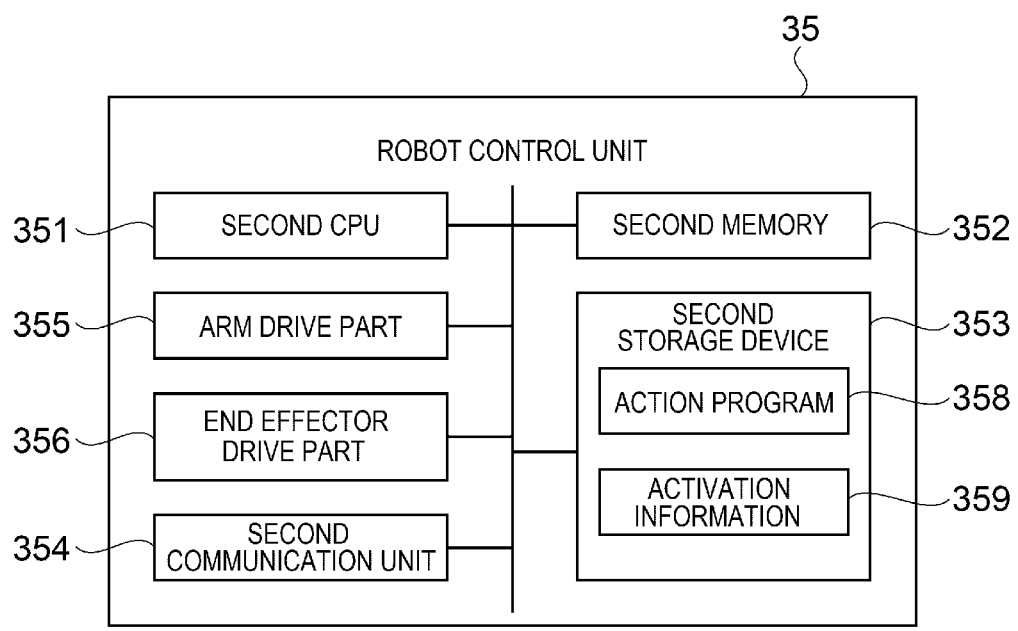
FIG. 4 is a block diagram for explanation of a schematic configuration of a robot control unit.

FIG. 4 is a block diagram showing the schematic configuration of the robot control unit 35. The robot control unit 35 is configured as a computer including a second CPU 351 and a second memory 352. The robot control unit 35 further includes a second storage device 353 and a second communication unit 354 for communication with the control apparatus 50. The robot control unit 35 further includes an arm drive part 355 and an end effector drive part 356. In the second storage device 353, an action program 358 for controlling actions of the respective components including the arm 31 and the end effector 34 for the robot 30 to produce products is stored.

The second CPU 351 is a processing circuit that executes the action program 358. The second CPU 351 transmits a command for driving the arm 31 to the arm drive part 355 according to the action program 358. The arm drive part 355 drives the servo motors provided in the respective joints of the arm 31 based on the command received from the second CPU 351. Further, the second CPU 351 transmits a command for driving the end effector 34 to the end effector drive part 356 according to the action program 358. The end effector drive part 356 drives a motor and various actuators provided in the end effector 34 based on the command received from the second CPU 351.

The second CPU 351 sequentially records activation information 359 of the robot 30 in the second storage device 353. The activation information 359 stored in the second storage device 353 is transmitted to the control apparatus 50 via the second communication unit 354 in response to a request from the control apparatus 50.

Figure 5:
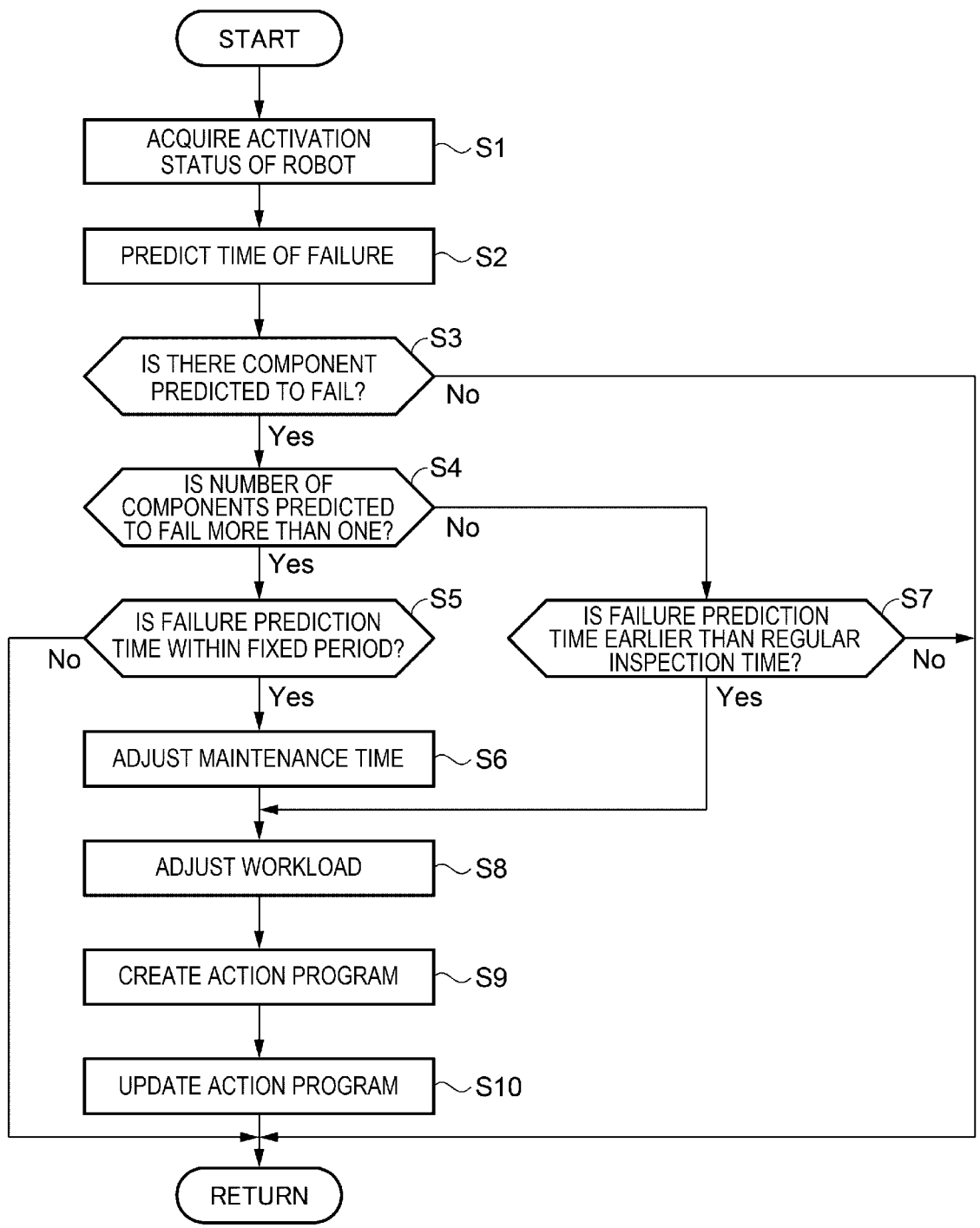
FIG. 5 is a flowchart for explanation of an example of failure countermeasure processing.

FIG. 5 is a flowchart of failure countermeasure processing executed by the control apparatus 50. In the embodiment, the failure countermeasure processing is executed at regular time intervals e.g., once a day or once a month with respect to each manufacturing cell 40.

When the failure countermeasure processing is executed by the control apparatus 50, at step S1, the failure prediction part 511 acquires the actuation information 359 from the respective robots 30. Then, at step S2, the failure prediction part 511 determines whether or not the respective robots 30 will fail within a predetermined period based on the acquired activation information 359 and predicts the times of failure of the components of the respective robots 30 determined to fail. Hereinafter, the predicted time of failure is also referred to as "failure prediction time".

At step S3, the failure prediction part 511 determines whether or not there is a component predicted to fail. When determining that there is no component predicted to fail, the failure prediction part 511 ends the failure countermeasure processing. On the other hand, when determining that there is a component predicted to fail, the failure prediction part 511 moves the processing to step S4.

At step S4, the failure prediction part 511 determines whether or not the number of components predicted to fail is larger than one. When the number of components predicted to fail is larger than one, the failure prediction part 511 moves the processing to step S5 and, when the number of components predicted to fail is one, moves the processing to step S7.

At step S5, the maintenance time adjustment part 512 determines whether or not the failure prediction times of the respective components fall within a predetermined period. In the embodiment, the period is set to six months including the maintenance times. The period may be determined according to e.g. a predetermined regular inspection cycle of the robot 30. When the failure prediction times fall within the predetermined period, the maintenance time adjustment part 512 adjusts the maintenance times at step S6 and, when the failure prediction times do not fall within the predetermined period, ends the failure countermeasure processing and does not adjust the maintenance times. As will be described later, at step S6, the maintenance time adjustment part 512 adjusts the maintenance times of the respective robots 30 in which the components predicted to fail are incorporated.

At step S7, the load adjustment part 513 determines whether or not the failure prediction time of the component of the robot 30 is earlier than a regular inspection time. When the failure prediction time is earlier than the regular inspection time, the load adjustment part 513 moves the processing to step S8 and, when the failure prediction time is at the same time as or later than the regular inspection time, ends the failure countermeasure processing. At step S8, the load adjustment part 513 adjusts the workload of the robot 30 so that the robot 30 may fail at the same time as or later than the regular inspection time. Specifically, when the failure prediction time is earlier than the maintenance time with respect to each robot 30 predicted to fail, the load adjustment part 513 decreases the workload and, when the failure prediction time is later than the maintenance time, increases the workload. Thereby, the workloads of the respective robots 30 are adjusted so that all of the robots 30 predicted to fail may be activated till the maintenance times and the whole productivity may not be lower.

At step S9, the load adjustment part 513 creates the action program 358 for realizing the workloads adjusted at step S8. Here, the maintenance times to be adjusted are the regular inspection times, however, may be other maintenance times for long-range maintenance or the like. At step S10, the load adjustment part 513 transmits the created action program to the robot control unit 35 of the robot 30 containing the component predicted to fail. The robot control unit 35 updates the action program 358 to the received action program. Note that the number of robots 30 predicted to fail is one, the failure countermeasure processing may be ended without execution of step S10. Further, steps S6, S8 may be repeated as appropriate.

FIG. 6 is a table for explanation of an example of maintenance time information 533 used for the method of adjusting maintenance times of the robot 30 in the embodiment. Here, with respect to each component predicted to fail, the maintenance time of one cell is defined according to the necessity of service, i.e., three types of conditions of the necessity of an outside operator, the replacement time of the component, and the start-up time. For example, regarding the cells A to F of the cells A to H in FIG. 6, pluralities of maintenance times are respectively listed as candidates. When the plurality of maintenance times are listed under the same conditions, the maintenance time adjustment part 512 adjusts the maintenance time by selecting the maintenance time at the lowest frequency of the maintenance times that can be shared with the other components predicted to fail.

FIG. 7 is a diagram for explanation of frequencies with respect to each maintenance time in the embodiment. In FIG. 7, the four types of maintenance times are exemplified. The maintenance times at the highest occurrence frequency are before the start of operation and after the end of operation, for example, the maintenances are planned every weekday. The maintenance time at the second highest occurrence frequency is for short-range maintenance, for example, planned every weekend. The maintenance time at the lowest occurrence frequency is for long-range maintenance, for example, planned in every long vacation once a year.

Figure 8:
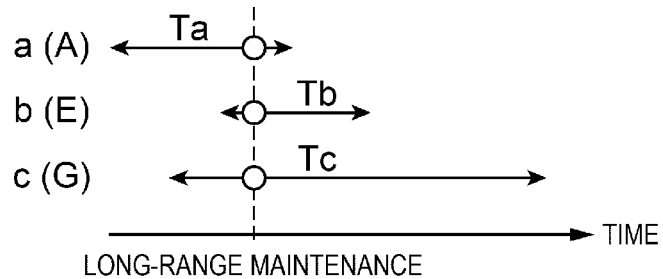
FIG. 8 is a diagram for explanation of an example of a method of adjusting maintenance times.

FIGS. 8 to 11 are diagrams for explanation of the method of adjusting maintenance times in the embodiment. As shown in FIG. 8, for example, the maintenance time adjustment part 512 selects the candidates of the maintenance times as one cell in FIG. 6 with respect to each of three components a to c predicted to fail of the respective robots 30. For the component a, the cell A is selected. The maintenance times occurring at the highest frequency of the cell A are before the start of operation and after the end of operation. For the component b, the cell E is selected. The maintenance time occurring at the highest frequency of the cell E is for the short-range maintenance. For the component c, the cell G is selected. The candidate of the maintenance time in the cell G is for only the long-range maintenance.

The maintenance time adjustment part 512 calculates maintenance time periods Ta to Tc with respect to each of the components a to c. Note that the components a to c are incorporated in the different robots 30 from one another. The maintenance time periods Ta to Tc are ranges that may be taken by the times of failure changing depending on the workload adjustment performed in the load adjustment part 513. That is, when the maintenance time is set within the maintenance time period, the load adjustment part 513 may adjust the load so that the time of failure may be after the maintenance time. When fails of a plurality of components are predicted in the single robot 30, for example, the maintenance time period may be calculated with respect to the components at the nearest failure prediction time. The maintenance time adjustment part 512 sets the maintenance time in common among the respective components a to c in the period in which the respective maintenance time periods Ta to Tc of the components a to c overlap with one another. In FIG. 8, the period in which the respective maintenance time periods Ta to Tc overlap contains the long-range maintenance as the maintenance time at the lowest frequency, and thereby, the maintenance is performed at the time of long-range maintenance. Therefore, the maintenance frequency may be suppressed and the productivity decline may be suppressed.

Figure 9:
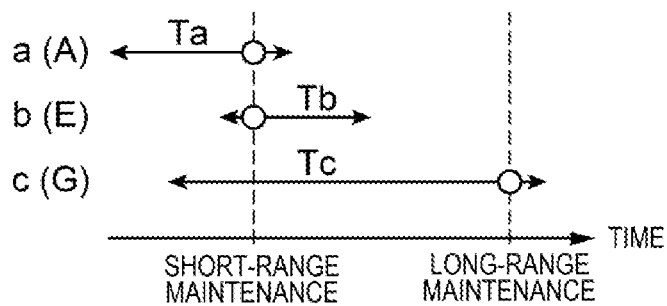
FIG. 9 is a diagram for explanation of another example of the method of adjusting the maintenance times.

As shown in FIG. 9, it is assumed that the long-range maintenance is not planned in the period in which the respective maintenance time periods Ta to Tc overlap, but the short-range maintenance is planned in the period in which the two maintenance time periods Ta, Tb overlap. In this case, the maintenance time adjustment part 512 may adjust the maintenance times for only the adjustable components a, b. In FIG. 9, the period in which the maintenance time periods Ta to Tc overlap contains the short-range maintenance. However, the cell G is selected for the component c and the candidate of the maintenance time is for only the long-range maintenance, and thus, the maintenance is infeasible in the short-range maintenance. In this case, the maintenances of the components a, b may be collectively performed in the short-range maintenance and the maintenance of the component c may be performed in the long-range maintenance separately from the components a, b.

Figure 10:
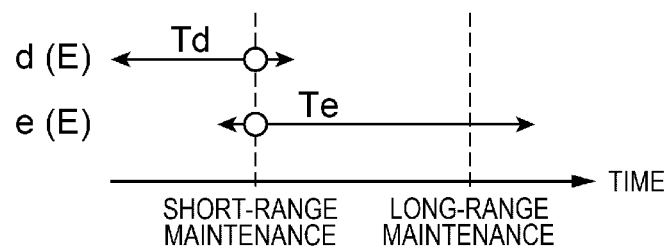
FIG. 10 shows another example of the method of adjusting the maintenance times.

As shown in FIG. 10, it is assumed that maintenances are necessary for a plurality of components d, e and the maintenance time of one component e can be adjusted to the long-range maintenance, but the maintenance is necessary for the other component d before the long-range maintenance. In this case, the maintenance times may be adjusted within a period in which the maintenance time periods for the plurality of components overlap. Specifically, the maintenance time adjustment part 512 calculates maintenance time periods Td, Te for the components d, e predicted to fail, respectively. In FIG. 10, the short-range maintenance is planned within a period in which the maintenance time periods Td, Te overlap with each other. The long-range maintenance is planned within the maintenance time period Te. Note that, in this case, the short-range maintenance is selected as the maintenance times for the components d, e, and thereby, the number of maintenances for the components d, e may be reduced and the productivity decline may be suppressed.

Figure 11:
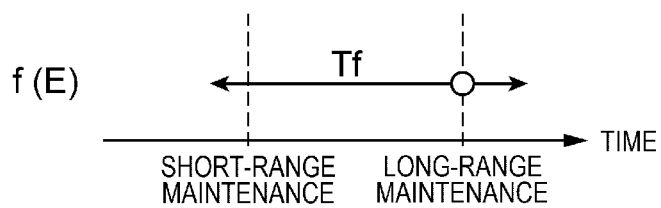
FIG. 11 shows another example of the method of adjusting the maintenance times.

As shown in FIG. 11, for example, it is assumed that a failure is predicted with respect to a component f and the short-range maintenance and the long-range maintenance are planned within a maintenance time period Tf. In this case, the maintenance time may be adjusted to the long-range maintenance at the lower frequency for only the robot 30 with the component f incorporated therein.

Figure 12:
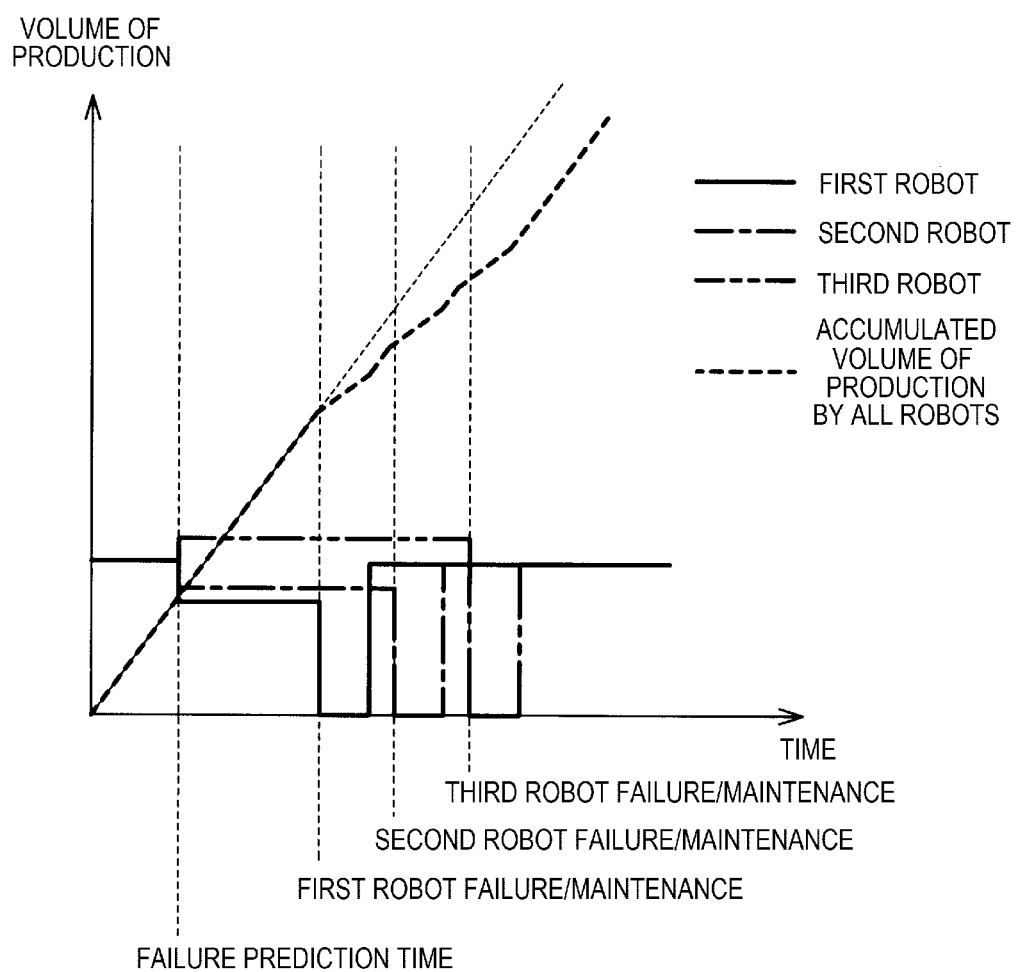
FIG. 12 is a diagram for explanation of a comparative example of load adjustment in the embodiment.

FIG. 12 is a diagram for explanation of the comparative example of load adjustment in the embodiment. In the graph shown in FIG. 12, the horizontal axis indicates time and the vertical axis indicates volumes of production by the first robot 30a, the second robot 30b, and the third robot 30c. Here, regarding the failure prediction time of each robot 30, the time of failure of the component predicted to fail at the earliest time is determined as the time of failure of the robot. The control apparatus 50 of the robot 30 having the above described configuration may appropriately determine the time of failure of the robot, even when failures are predicted for a plurality of components. Thereby, the maintenance frequency may be suppressed and the productivity decline may be suppressed.

In the comparative example shown in FIG. 12, in the initial state, the respective robots 30 perform production of products in fixed volumes of production. Then, failure prediction is performed at a certain time, and adjustment of the volumes of production of the respective robots 30 is performed to secure the whole volume of production according to the prediction result. However, in the adjustment, the maintenance times are not particularly considered. As a result, regarding the respective robots 30, the times of failure come at the respective different times and the maintenance work is necessary at each time.

Figure 13:
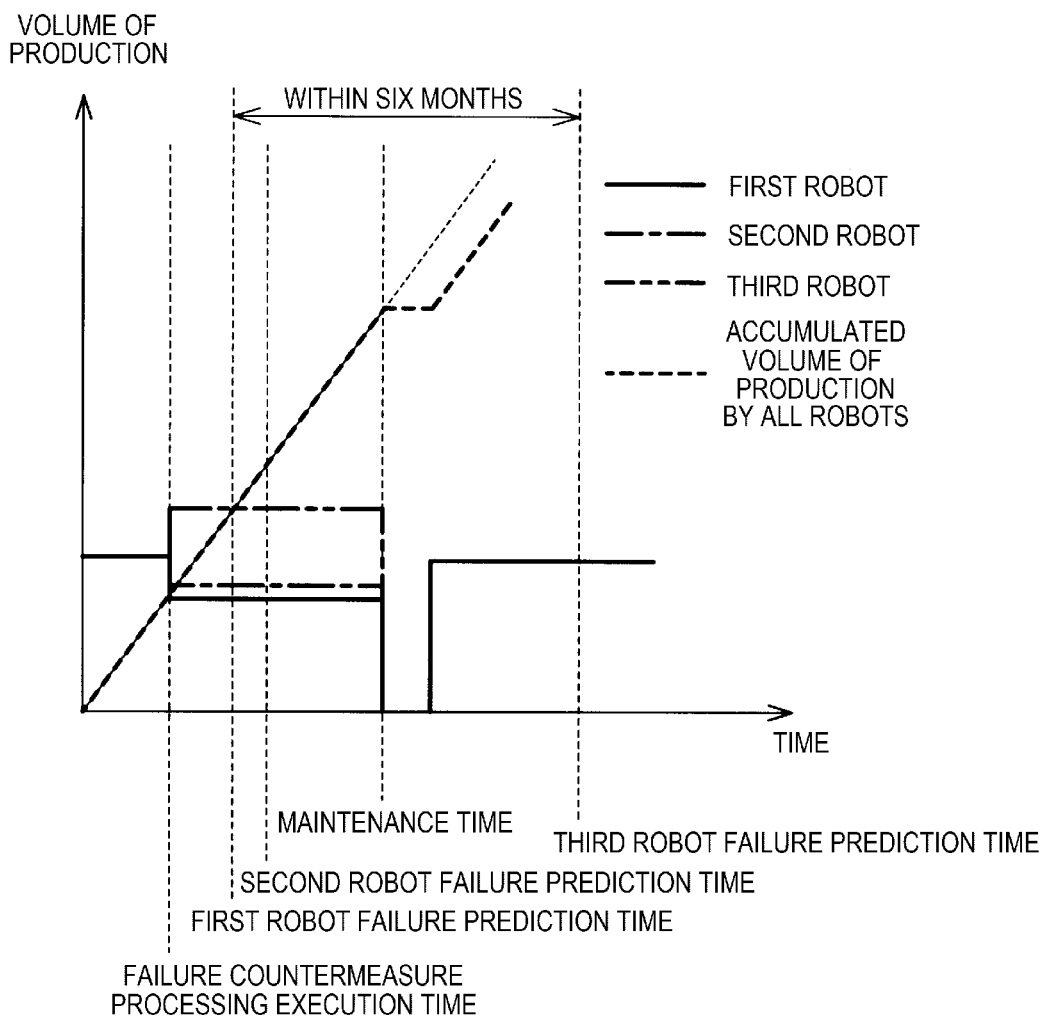
FIG. 13 is a diagram for explanation of an example of load adjustment in the embodiment.

FIG. 13 is a diagram for explanation of an example of load adjustment in the embodiment. In the example shown in FIG. 13, similarly to the comparative example shown in FIG. 12, in the initial state, the respective robots 30 perform production of products in fixed volumes of production. Then, failure countermeasure processing shown in FIG. 5 is performed at a certain time, and the times of failure and the maintenance times of the respective robots 30 are predicted. Then, the workloads of the respective components are adjusted by the control apparatus 50 according to the maintenance times of the respective robots 30. Regarding each robot 30 predicted to fail, when the failure prediction time is earlier than the maintenance time, the load adjustment part 513 decreases the workload by reducing the operation speeds and reducing the volume of production per unit time and, when the failure prediction time is later than the maintenance time, increases the workload by increasing the operation speeds and increasing the volume of production per unit time. Thereby, the control apparatus 50 adjusts the workloads of the respective robots 30 so that the times of failure of all robots predicted to fail may come at the maintenance times.

In the example shown in FIG. 13, regarding the first robot 30*a* and the second robot 30*b*, the failure prediction times are earlier than the maintenance times and the volumes of production are reduced. Regarding the third robot 30*c*, the failure prediction time is later than the maintenance time and the volume of production is increased to compensate for the reduction of the volumes of production of the first robot 30*a* and the second robot 30*b*. That is, the load adjustment part 513 adjusts the volumes of production of the respective robots 30 so that the volumes of production of products in the manufacturing cells 40 may not vary before and after the workload adjustment. When a predetermined maintenance time comes after the workload adjustment, maintenance work is performed at the same time with respect to all robots 30 predicted to fail regardless of whether or not a failure actually occurs at the time.

As described above, in the embodiment, unlike the comparative example shown in FIG. 12, the workloads are adjusted so that the respective robots 30 may be activated to the maintenance times, and thereby, the maintenance work may be performed at the same time for the respective robots 30. As a result, the labor costs required for the maintenance work or the cost for security protection may be reduced, and thus, productivity decline of the factory or the manufacturing cells 40 may be suppressed. Particularly, in a factory in which shutdown of the whole manufacturing cells 40 or the whole factory is necessary for security protection, in the embodiment, the maintenance work may be performed at a time and productivity decline may be significantly suppressed compared to a comparative example in which the times for maintenance work vary.

Further, in the embodiment, when the failure prediction times of the respective robots 30 fall within a certain period, the workloads of the respective components are adjusted so that the times of failure of the respective robots 30 may come at the maintenance times. Accordingly, when the failure prediction times of the respective components are extremely separated or the like, extreme decrease or increase of the workloads of the robots 30 may be suppressed. As a result, a situation that the performance that the robot 30 originally has is not exerted or a situation in which the robot is activated with a load exceeding the original performance may be suppressed by the workload adjustment.

Other Embodiments

In the above described embodiment, when a plurality of components are predicted to fail within a certain period, the maintenance time adjustment part 512 performs maintenances according to the longest maintenance time of the selectable maintenance times. However, when a plurality of maintenance times can be selected, a short maintenance time may be selected. Specifically, when C and E in FIG. 6 are predicted to fail, the short-range maintenance or the long-range maintenance can be selected as the maintenance time. When the maintenance time period contains both, the short-range maintenance may be selected. In the long-range maintenance, the influence by shutdown is expected to be smaller, however, when an apparatus is regularly shut down at the short-range maintenance time, the maintenance planning is easier with the short-range maintenance time.

In the above described embodiment, when the failure prediction times of the respective robots 30 fall within a certain period, the maintenance time adjustment part 512 performs workload adjustment for the respective robots 30. However, the maintenance time adjustment part 512 may adjust workloads of the respective robots 30 regardless of whether or not the failure prediction times of the respective components fall within a certain period.

In the above described embodiment, when the failure prediction times of all components predicted to fail do not fall within a certain period, the maintenance time adjustment part 512 does not perform workload adjustment of the respective robots 30. On the other hand, even when the failure prediction times of all components do not fall within a certain period, the maintenance time adjustment part 512 may adjust the workload with respect to only the robot 30 having the failure prediction time within a certain period and may not adjust the workload with respect to the robot 30 having the failure prediction time outside the certain period.

In the above described embodiment, the control apparatus 50 executes the failure countermeasure processing shown in FIG. 5 in units of manufacturing cells 40. On the other hand, the control apparatus 50 may execute the failure countermeasure processing shown in FIG. 5 in the whole factory.

In the above described embodiment, for the adjustment of the maintenance times, the maintenance time adjustment part 512 may adjust the workloads of the respective robots 30 so that the times of failure may be delayed as late as possible within a range in which shipment may be fulfilled using stock of products. In this case, the maintenance time adjustment part 512 may adjust the maintenance times in synchronization with the delayed times of failure.

The present disclosure is not limited to the above described embodiments, but may be realized in various configurations without departing from the scope thereof. For example, the technical features of the embodiments corresponding to the technical features in the following respective embodiments can be appropriately replaced or combined for solving part or all of the above described problems or achieving part or all of the above described effects. Further, the technical features can be appropriately deleted unless the technical features are explained as essential features in this specification. Furthermore, the present disclosure can be realized in various other aspects than the above described aspect as the control apparatus. For example, the present disclosure may be realized in aspects of a control method for robot, a system including a robot and a control apparatus, a computer program for controlling a robot, a non-transitory tangible recording medium in which the computer program is recorded, etc.

As below, the details derived from the above described embodiments will be described as respective embodiments.

A first embodiment is a control apparatus that controls a plurality of robots, including a failure prediction part that predicts a time of failure with respect to each component of the robots, a maintenance time adjustment part that adjusts maintenance times of the plurality of robots based on the components for which the times of failure are predicted, and a load adjustment part that adjusts workloads of the robots according to the predicted times of failure for activation until the maintenance times. According to the first embodiment, the times of failure of the components of the respective robots may be synchronized and maintenance work may be performed at a time, and thereby, maintenances can be efficiently performed and productivity decline may be significantly suppressed.

In a second embodiment, in the first embodiment, the maintenance time adjustment part adjusts the maintenance times based on necessity of an operator in maintenances on the components for which the times of failure are predicted. According to the second embodiment, the maintenance times may be adjusted in consideration of costs required for the maintenance work.

In a third embodiment, in the first or second embodiment, the maintenance time adjustment part adjusts the maintenance times based on times necessary for maintenances on the components for which the times of failure are predicted. According to the third embodiment, the maintenance times may be adjusted in consideration of times required for the maintenance work.

In a fourth embodiment, in any one of the first to third embodiments, the maintenance time adjustment part adjusts the maintenance times based on times necessary from ends of maintenances on the components for which the times of failure are predicted to activation of the robots. According to the fourth embodiment, the maintenance times may be adjusted in consideration of times required for the maintenance work.

In a fifth embodiment, in any one of the first to fourth embodiments, the maintenance time adjustment part adjusts the maintenance times when the predicted respective times of failure fall within a predetermined period and does not adjust the maintenance times when the predicted respective times of failure do not fall within the period. According to the fifth embodiment, for example, when the predicted times of failure of the respective robots are extremely separated or the like, extreme decrease or increase of the workloads of the robots may be suppressed.

In a sixth embodiment, in any one of the first to fifth embodiments, the load adjustment part decreases the workloads when the predicted times of failure are earlier than the maintenance times and increases the workloads when the predicted times of failure are later than the maintenance times. According to the sixth embodiment, reduction in volumes of production of the plurality of robots and the whole factory may be suppressed.

In a seventh embodiment, in any one of the first to sixth embodiments, the failure prediction part predicts the respective times of failure with respect to the plurality of components, and determines the times of failure of the component having the earliest predicted time of failure of the plurality of components as the time of failure of the robot. According to the seventh embodiment, even when failures are predicted in the plurality of components, the times of failure of the robots may be appropriately determined.

An eighth embodiment is a control method for a plurality of robots executed by a control apparatus, including predicting a time of failure with respect to each component of the robots, adjusting maintenance times of the plurality of robots based on the components for which the times of failure are predicted, and adjusting workloads of the robots according to the predicted times of failure for activation until the maintenance times. According to the eighth embodiment, the times of failure of the components of the respective robots may be synchronized and maintenance work may be performed at a time, and thereby, maintenances can be efficiently performed and productivity decline may be significantly suppressed.

What is claimed is:

1. A control apparatus for controlling a plurality of robots, comprising:
a failure prediction part configured to predict a time of failure with respect to each of a plurality of components of each of the plurality of robots, and using the predicted time of failure to predict a time of failure for each of the plurality of robots;
a maintenance time adjustment part configured to determine whether predicted failure times of the plurality of robots fall within a predetermined period and, when it is determined that the predicted failure times of the plurality of robots fall within the predetermined period, adjust a maintenance time based on predicted times of failure for the plurality of robots such that a predicted failure time of a first robot of the plurality of robots is prior to the adjusted maintenance time and such that a predicted failure time of a second robot of the plurality of robots is after the adjusted maintenance time; and
a load adjustment part configured to adjust workloads of the plurality of robots by reducing the workload of the first robot whose predicted failure time is prior to the adjusted maintenance time; and
increasing the workload of the second robot whose predicted failure time is after the adjusted maintenance time, wherein
an overall production volume per unit time is maintained from the predicted failure time of the first robot to the adjusted maintenance time.

2. The control apparatus according to claim 1, wherein the maintenance time adjustment part is configured to adjust maintenance times of any robot when there are multiple of the plurality of components that are predicted to fail based on necessity of an operator in maintenances on the components for which the times of failure are predicted.

3. The control apparatus according to claim 1, wherein the maintenance time adjustment part is configured to adjust the maintenance times of any robot when there are multiple of the plurality of components that are predicted to fail based on times necessary for maintenances on the components for which the times of failure are predicted.

4. The control apparatus according to claim 1, wherein the maintenance time adjustment part is configured to adjust the maintenance times of any robot when there are multiple of the plurality of components that are predicted to fail based on times necessary from ends of maintenances on the components for which the times of failure are predicted to activation thereof.

5. The control apparatus according to claim 1, wherein the maintenance time adjustment part is configured to adjust the maintenance times of any robot when there are multiple of the plurality of components that are predicted to fail when the predicted respective times of failure of components that are predicted to fail fall within a predetermined period and does not adjust the maintenance times when the predicted respective times of failure of components that are predicted to fail do not fall within the period.

6. The control apparatus according to claim 1, wherein the failure prediction part is configured to predict the respective times of failure with respect to the plurality of components of any robot, and determine a time of failure of a component having the earliest predicted time of failure of the plurality of components as the time of failure of the any robot.

7. The control apparatus according to claim 1, wherein the maintenance time adjustment part is further configured such that if there is only one particular component predicted to fail of any robot and the predicted time of failure for that particular component is earlier than a regular inspection time, the maintenance time adjustment part does not adjust a maintenance time for the any robot.

8. A control method for a plurality of robots executed by a control apparatus, comprising:
  predicting a time of failure with respect to each of a plurality of components of each of the plurality of robots;
  determining whether predicted failure times of the plurality of robots fall within a predetermined period;
  adjusting, when it is determined that the predicted failure times of the plurality of robots fall within the predetermined period, a maintenance time based on predicted times of failure for the plurality of robots such that a predicted failure time of a first robot of the plurality of robots is prior to the adjusted maintenance time and such that a predicted failure time of a second robot of the plurality of robots is after the adjusted maintenance time; and
  adjusting workloads of the plurality of robots by:
    reducing the workload of the first robot whose predicted failure time is prior to the adjusted maintenance time; and
    increasing the workload of the second robot whose predicted failure time is after the adjusted maintenance time, wherein
  an overall production volume per unit time is maintained from the predicted failure time of the first robot to the adjusted maintenance time.

* * * * *